United States Patent
Pei et al.

(10) Patent No.: US 12,467,145 B2
(45) Date of Patent: Nov. 11, 2025

(54) COMPOSITE MATERIAL FOR IMPROVING METAL CONDUCTIVITY AND METHOD OF PREPARING THE SAME

(71) Applicant: CRRC ACADEMY CORPORATION LIMITED, Beijing (CN)

(72) Inventors: Zhongzheng Pei, Beijing (CN); Xiaohui Zhang, Beijing (CN); Baishan Liu, Beijing (CN); Juncai Liang, Beijing (CN); Yaojun Li, Beijing (CN); Weisan Yang, Beijing (CN); Qiang Chen, Beijing (CN); Yalun Wang, Beijing (CN); Bangcheng Sun, Beijing (CN); Ming Gong, Beijing (CN)

(73) Assignee: CRRC ACADEMY CORPORATION LIMITED, Beijing (CN)

( * ) Notice: Subject to any disclaimer, the term of this patent is extended or adjusted under 35 U.S.C. 154(b) by 102 days.

(21) Appl. No.: 18/270,635

(22) PCT Filed: Aug. 18, 2021

(86) PCT No.: PCT/CN2021/113324
§ 371 (c)(1),
(2) Date: Jun. 30, 2023

(87) PCT Pub. No.: WO2023/019484
PCT Pub. Date: Feb. 23, 2023

(65) Prior Publication Data
US 2024/0052491 A1 Feb. 15, 2024

(51) Int. Cl.
*C23C 16/56* (2006.01)
*C23C 16/26* (2006.01)

(52) U.S. Cl.
CPC .............. *C23C 16/56* (2013.01); *C23C 16/26* (2013.01)

(58) Field of Classification Search
None
See application file for complete search history.

(56) References Cited

U.S. PATENT DOCUMENTS

2019/0062921 A1 2/2019 Adams
2022/0389540 A1 12/2022 Kraft

FOREIGN PATENT DOCUMENTS

| | | |
|---|---|---|
| CN | 102815695 | 12/2012 |
| CN | 106584976 | 4/2017 |
| CN | 110371955 | 10/2019 |
| JP | 2020098909 | 6/2020 |
| JP | 2020531408 | 11/2020 |
| WO | WO 2019220903 | 11/2019 |

OTHER PUBLICATIONS

Extended European Search Report in European Appln. No. 21953731.3, mailed on Apr. 12, 2024, 8 pages.
Office Action in Japanese Appln. No. 2023-519925, mailed on Mar. 12, 2024, 8 pages (Submitted with Machine Translation).
International Search Report and Written Opinion in International Appln. No. PCT/CN2021/113324, mailed on Dec. 24, 2021, 11 pages (submitted with English translation).
Office Action in Chinese Appln. No. 2021800022526, dated Jun. 6, 2022, 12 pages (submitted with machine/partial translation).

*Primary Examiner* — Cheng Yuan Huang
(74) *Attorney, Agent, or Firm* — Fish & Richardson P.C.

(57) ABSTRACT

The present invention relates to a composite material for improving metal conductivity and a method of preparing the same. The composite material includes a composite of n A-B-A structures, where A is a graphene fragment layer, B is a metal foil layer, and n is an integer greater than or equal to 2; and the graphene fragment layer includes graphene fragments uniformly laid flat on the metal foil layer. The conductivity of the conventional metal material is increased by at least 18%, and the conductivity of the conventional metal material in a bending state remains almost the same as in a normal state.

8 Claims, 3 Drawing Sheets

COMPOSITE MATERIAL FOR IMPROVING METAL CONDUCTIVITY AND METHOD OF PREPARING THE SAME

CROSS-REFERENCE TO RELATED APPLICATION

This application is a U.S. National Phase application under 35 U.S.C. § 371 of International Patent Application No. PCT/CN2021/113324, filed on Aug. 18, 2021, the contents of which are hereby incorporated by reference in their entirety.

TECHNICAL FIELD

This disclosure relates to the technical field of metal-matrix composite materials, and in particular to a composite material for improving metal conductivity and a method of preparing the same.

BACKGROUND

Electric energy is the most important energy source in the production and life of contemporary society. The National Bureau of Statistics shows that China's total annual electricity consumption is 7.15 trillion kilowatt-hours (2018), of which the annual transmission and distribution losses amount to 335.17 billion kilowatt-hours, which is equivalent to the power generation capacity of the Three Gorges for three years. Therefore, improving the conductivity of conductive materials can significantly reduce the transmission and distribution losses, and make great contributions to energy conservation and emission reduction.

Document CN106584976A discloses a high-conductivity graphene/copper-matrix layered composite material and a preparation method thereof, which is based on a copper matrix with high purity and having single crystals or near single crystals, so as to develop a conductivity superior to that of pure silver. However, during the hot pressing process of the above composite material, the graphene may be fractured disorderly, which tends to produce some structures with too large graphene fragments and with too small or too large distances between the graphene fragments. If the fragments are too large and/or the distances between the fragments are too small, the graphene is subjected to a high stress in a bending state and may be further fractured disorderly, in which case uniform and good carrier channels cannot be formed, thereby reducing the conductivity of the material in bending applications. If the distances between the fragments are too large, good carrier channels cannot be formed either. In addition, for conventional conductive metals, and alloys or composites thereof, such composite materials obtained in the manner described in the above document cannot improve the corresponding conductivity and the conductivity in the bending state due to their single crystal structure different from the copper surface and their non-high purity.

Given the current demand for more and more applications in the bending state, the conductivity of conventional conductive metal materials is to be improved.

SUMMARY

The present disclosure aims to provide a composite material for improving metal conductivity, which solves the problems of low conductivity of the conventional metal material and low conductivity of the conventional metal material in further bending applications, such that the conductivity of the conventional metal material is increased by at least 18%, and the conductivity of the conventional metal material in a bending state remains almost the same as in a normal state.

The present disclosure will be described in detail below.

The present disclosure relates to a composite material for improving metal conductivity. The composite material includes a composite of n A-B-A structures, where A is a graphene fragment layer, B is a metal foil layer, and n is an integer greater than or equal to 2.

Preferably, n is in the range of 10 to 30, within which the composite material with the following mass and volume fractions may be easily obtained.

Further, the graphene fragment layer includes graphene fragments uniformly laid flat on the metal foil layer.

Further, an area of each of the graphene fragments is 50-1000 $\mu m^2$, and a distance between adjacent two of the graphene fragments is 5-20 $\mu m$.

Further, the graphene fragments are formed by fracturing chemically unmodified graphene which is single-layered, double-layered, or multi-layered.

Chemical modification, such as redox of the graphene, may bring many defects and impurities to the graphene, affecting the mobility of the graphene, which is not conducive to the design and preparation of a high-conductivity composite material.

Further, a mass fraction of the graphene fragments in the composite material is 0.0004%-0.07%, or a volume fraction of the graphene fragments in the composite material is 0.001%-0.05%.

The mass fraction is obtained from the volume fraction and a density of different metal foil layers.

The above content of the graphene fragments can not only realize the optimal conductivity, but also ensure the tensile strength, bending and other properties of the composite material. The above properties cannot be realized if the content of the graphene fragments is too high or too low.

Further, the metal foil layer is made of a conventional conductive metal material, and is not limited to high-purity copper with a single crystal structure.

Further, the metal foil layer is made of at least one of silver, copper, aluminum, magnesium, and alloys or composites thereof.

Further, the metal foil layer has a thickness of 10-50 $\mu m$.

It is difficult to meet the above mass fraction or volume fraction for both too thick and too thin metal foil layers.

Further, the present disclosure further relates to a method of improving metal conductivity, including: compounding n A-B-A structures into a composite material, where A is a graphene fragment layer, B is a metal foil layer, and n is an integer greater than or equal to 2; and the graphene fragment layer includes graphene fragments uniformly laid flat on the metal foil layer.

Further, an area of each of the graphene fragments is set to be 50-1000 $\mu m^2$, and a distance between adjacent two of the graphene fragments is set to be 5-20 $\mu m$.

Further, graphene is deposited on upper and lower surfaces of the metal foil layer by CVD, and then the graphene is uniformly fractured by stretching to form the graphene fragments with certain areas and distances so as to form the A-B-A structure, and the composite material is formed by hot pressing the n A-B-A structures.

Deposition of the graphene by CVD avoids the disadvantages of chemical modification and other methods, and allows to obtain high-quality graphene with small defects, which is conducive to the formation of carrier channels.

The graphene can be uniformly fractured with the extension of the metal foil layer by XY bidirectional stretching, and the graphene fragments with certain areas and spacing can be produced by controlling the stretching force. The stretching and controlling described above are implemented with a general experimental device capable of realizing uniform stretching.

The graphene is fractured on the metal foil layer in advance, such that the areas of the graphene fragments and the spacing between the fragments are controllable, reducing the stress on the graphene, and greatly reducing the possibility of further disorderly fracture and fragmentation during the hot pressing process. This can prevent the formation of the graphene fragments with too large spacing during the hot pressing process, which makes it impossible to form the carrier channels. Also, this can prevent the formation of the graphene fragments with too small spacing during the hot pressing process, which would further lead to disorderly fracture of the final composite material due to excessive stress in the bending state, thereby reducing the conductivity or experiencing sudden drop and instability of the conductivity.

The principle of the present disclosure is as follows. It is generally believed that when the graphene and the metal are compounded, the more complete the graphene is, the better. However, it is impossible to ensure no fracture of the graphene during the hot pressing process. Traditionally, researches are carried out in the direction of not fracturing the graphene and reducing the distances between the fractured graphene. It is found in the present disclosure that when the graphene forms fragments, and the areas of the fragments and the distances between the fragments are respectively within certain ranges, the graphene can form uniform carrier channels while reducing the stress on graphene fragments with larger areas. This can not only achieve the conductivity close to that of a complete graphene composite material, but also enable the conductivity of the composite material to remain substantially unchanged after bending, and enable the graphene adaptable to various conventional metal conductive materials, reducing the requirements for the metal materials, and increasing the conductivity of the conventional metal conductive materials by at least 18%.

Compared with the related art, the present disclosure has the following advantages.

I. The structure according to the present disclosure has the characteristic of supporting the metal composite material to realize a high conductivity. Therefore, the structure can be widely used in industrial drive fields such as motors and transformers, new energy fields such as new energy vehicles, wind power generation, photovoltaic power generation, and nuclear power, electric power industries such as cables and electrical cabinets, and high-end application fields such as communication chips and industrial control chips. Since the structure according to the present disclosure can maintain excellent conductivity properties in the bending state, the present disclosure is especially suitable for applications where the material is in the bending state, such as winding coils for electric motors.

II. Since the structure according to the present disclosure allows the graphene to have a large number of fragments and relatively large distances between the fragments, it is not necessary to reduce the fragmentation of the graphene and the distances between the fragments as tough as in the traditional method, such that there are no strict requirements on the number of layers and integrity of the graphene, the morphology, size and distance between the grapheme fragments, or the type of metal.

III. Due to the relatively appropriate distances between the graphene fragments, the structure according to the present disclosure can improve the conductivity while ensuring that the conductivity of the composite material is almost unchanged in the bending state.

BRIEF DESCRIPTION OF DRAWINGS

In order to more clearly illustrate the technical solutions in the embodiments of the present disclosure, the drawings to be used in the description of the embodiments will be briefly introduced below. Obviously, the drawings in the following description merely illustrate some embodiments of the present disclosure, and those ordinary skilled in the art can obtain other drawings from these drawings without any creative efforts.

Where A is a graphene fragment layer and B is a metal foil layer.

DETAILED DESCRIPTION

In order to further understand the present disclosure, preferred embodiments of the present disclosure will be described below in conjunction with some examples, but these descriptions are only further illustrative of the features and advantages of the present disclosure and are not intended to limit the claims of the present disclosure.

Figure 1:
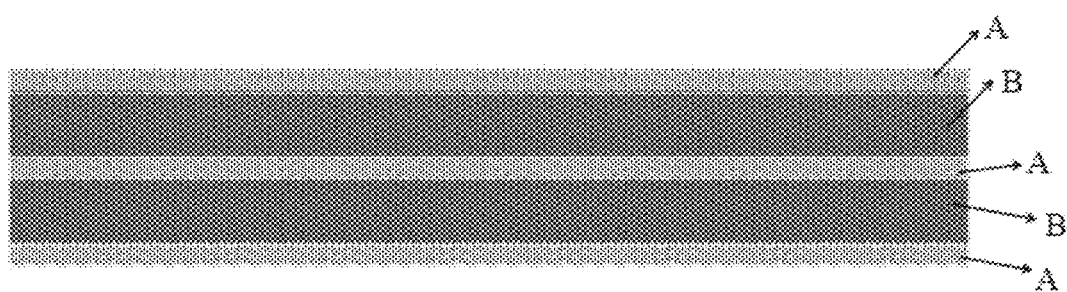
FIG. 1 is a schematic diagram illustrating a composite material after two A-B-A structures are compounded according to the present disclosure.

FIG. 1 illustrates one of the embodiments of the present disclosure. In particular, a composite material for improving metal conductivity includes a composite of two A-B-A structures, where A indicates a graphene fragment layer, and B indicates a metal foil layer. The graphene fragment layer A includes graphene fragments uniformly laid flat on the metal foil layer B.

Example 1

Figure 2:
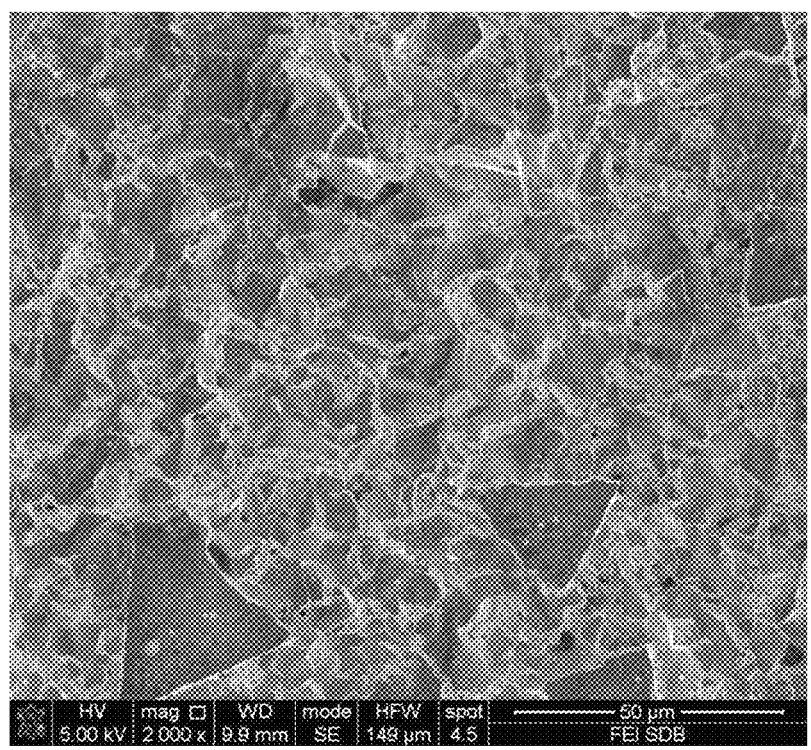
FIG. 2 is a scanning electron microscope morphology of a graphene fragment layer in a composite material according to Example 1, which may also represent a morphology of A in FIG. 1.
Figure 3:
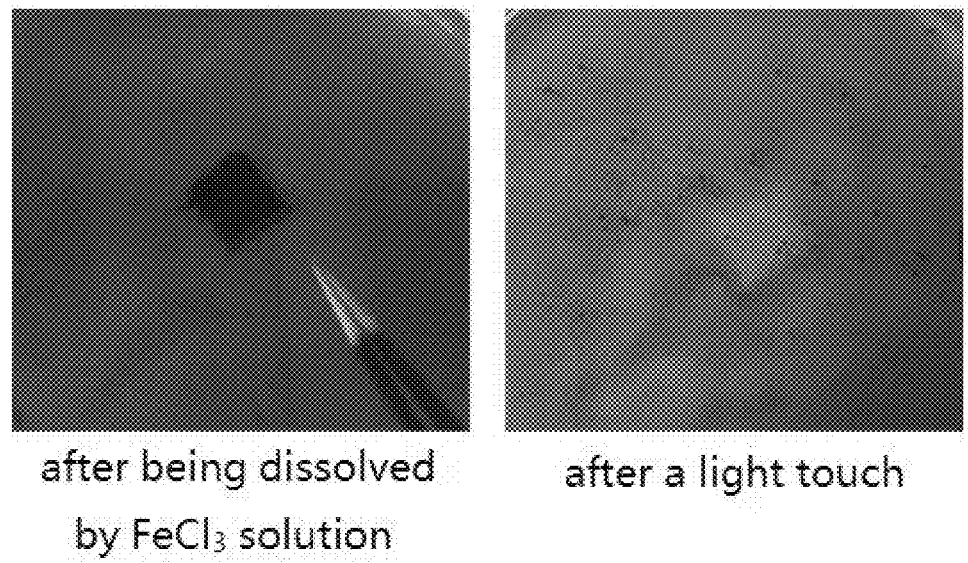
FIG. 3 is a macroscopic morphology of remaining graphene fragments in a composite material according to Example 1 after metal has been dissolved by an etchant solution.
Figure 4:
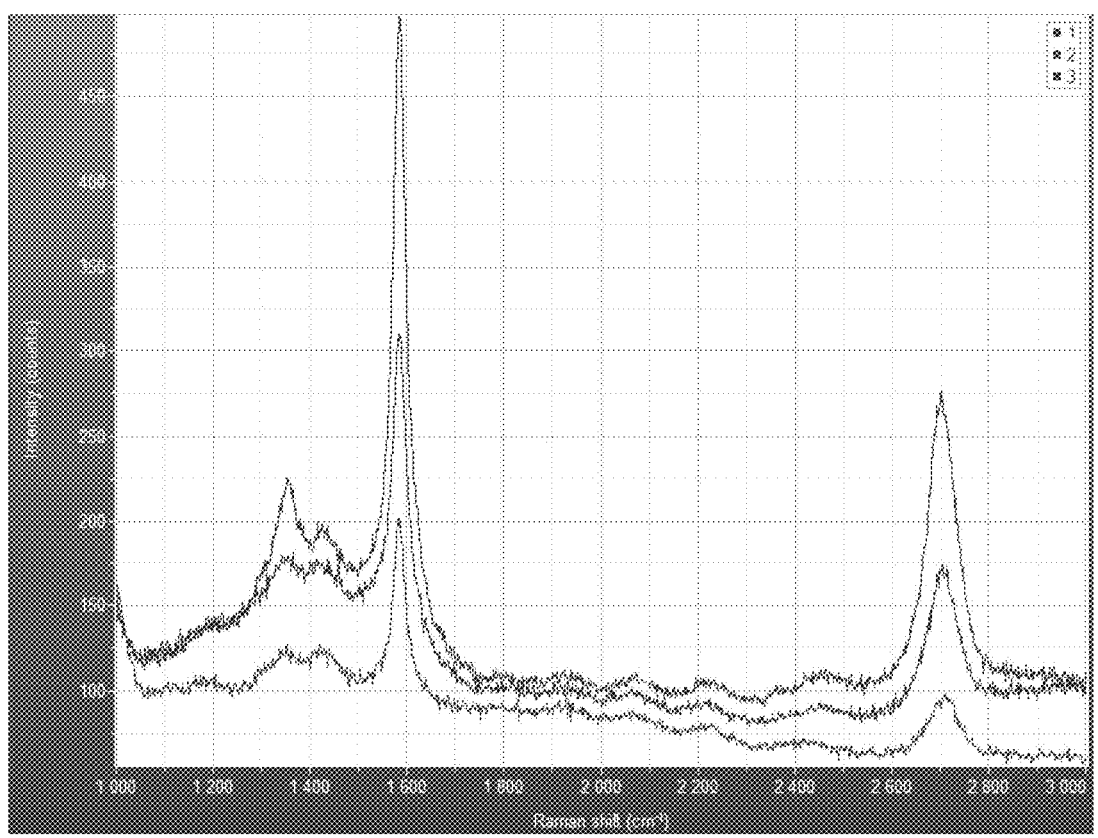
FIG. 4 is a Raman spectrogram of remaining graphene fragments in a composite material according to Example 1 after metal has been dissolved by an etchant solution.

Graphene is deposited on both side surfaces of a rolled copper foil with a thickness of 30 μm by CVD (Chemical Vapor Deposition) to respectively form continuous single-layer high-quality graphene, where a mass fraction of the graphene in the composite material is controlled to be about 0.0008%, or a volume fraction of the graphene in the composite material is controlled to be about 0.003%, so as to obtain a graphene-copper foil three-layer structure. The graphene is controlled to be fractured uniformly by stretching, and the 20-layer graphene-copper foil is formed by using a hot isostatic pressing device at a temperature of 920° C. and a pressure of 45 MPa. The formed graphene-copper composite material has a conductivity of 119.84% IACS by a four-probe method, has a tensile strength of 258 MPa, and has a conductivity of 118.91% IACS after a bending test, where the bending test refers to a test in which bending is performed at all angles to a certain extent, and the following bending tests are the same. The copper on one side surface of the graphene-copper composite material is etched with an etchant solution to expose the morphology of the graphene, which is observed by a scanning electron microscope. The results show (in FIG. 2) that, the graphene is uniformly distributed within the copper matrix even after random fracture within the composite material, and has the morphology of rectangular fragments. Each of the fragments has an area of 50-1000 $\mu m^2$, and spacing between the fragments is 5-20 $\mu m$ in two directions perpendicular to each other. As shown in FIG. 3, after the graphene-copper composite material is soaked in $FeCl_3$ solution and the copper is dissolved, it is observed that the macroscopic morphology of the graphene is in the form of black particles, which also indicates that the morphology of the graphene in the composite material is not a complete graphene film, but a fragment. FIG. 4 illustrates a Raman spectrogram of the remaining graphene in the graphene-copper composite material after being dissolved by $FeCl_3$ solution, which indicates that the graphene has fewer layers and does not undergo significant agglomeration. The above experimental results show that the composite material in this Example conforms to the composite structure of the present disclosure, that is, the fragmented high-quality graphene is continuously and uniformly distributed in the matrix of the metal material, and it is ensured that the graphene fragments have appropriate sizes and spacing to form fast migration channels for carriers, such that the conductivity of the conductive metal can be increased by more than 18%.

Example 2

Graphene is deposited on both side surfaces of an electrolytic aluminum foil with a thickness of 40 $\mu m$ and a conductivity of 59.1% IACS by CVD to respectively form continuous multi-layer high-quality graphene, where a mass fraction of the graphene in the composite material is controlled to be about 0.01%, or a volume fraction of the graphene in the composite material is controlled to be about 0.01%, so as to obtain a graphene-aluminum foil three-layer structure. The graphene is controlled to be fractured uniformly by stretching, and the 10-layer graphene-aluminum foil is formed by using a hot pressing device at a temperature of 480° C. and a pressure of 15 MPa. The formed graphene-aluminum composite material has a conductivity of 71.52% IACS by a four-probe method, has a tensile strength of 223 MPa, and has a conductivity of 69.98% IACS after a bending test. The aluminum on one side surface of the graphene-aluminum composite material is etched with an etchant solution to expose the morphology of the graphene, which is observed by a scanning electron microscope. The results show that, the graphene is uniformly distributed within the aluminum matrix after random fracture within the composite material, and has the morphology of polygonal fragments. Each of the fragments has an area of 50-1000 $\mu m^2$, and spacing between the fragments is 5-20 $\mu m$ in two directions perpendicular to each other.

Example 3

Graphene is deposited on both side surfaces of a silver foil with a thickness of 20 $\mu m$ and a conductivity of 107.8% IACS by CVD to respectively form continuous double-layer high-quality graphene, where a mass fraction of the graphene in the composite material is controlled to be about 0.002%, or a volume fraction of the graphene in the composite material is controlled to be about 0.01%, so as to obtain a graphene-silver foil three-layer structure. The graphene is controlled to be fractured uniformly by stretching, and the 15-layer graphene-silver foil is formed by using a hot pressing device at a temperature of 800° C. and a pressure of 40 MPa. The formed graphene-silver composite material has a conductivity of 127.59% IACS by a four-probe method, has a tensile strength of 129 MPa, and has a conductivity of 126.33% IACS after a bending test. The silver on one side surface of the graphene-silver composite material is etched with an etchant solution to expose the morphology of the graphene, which is observed by a scanning electron microscope. The results show that, the graphene is uniformly distributed within the silver matrix after random fracture within the composite material, and has the morphology of rectangular fragments. Each of the fragments has an area of 50-1000 $\mu m^2$, and spacing between the fragments is 5-20 $\mu m$ in two directions perpendicular to each other.

Comparative Example 1

Figure 5:
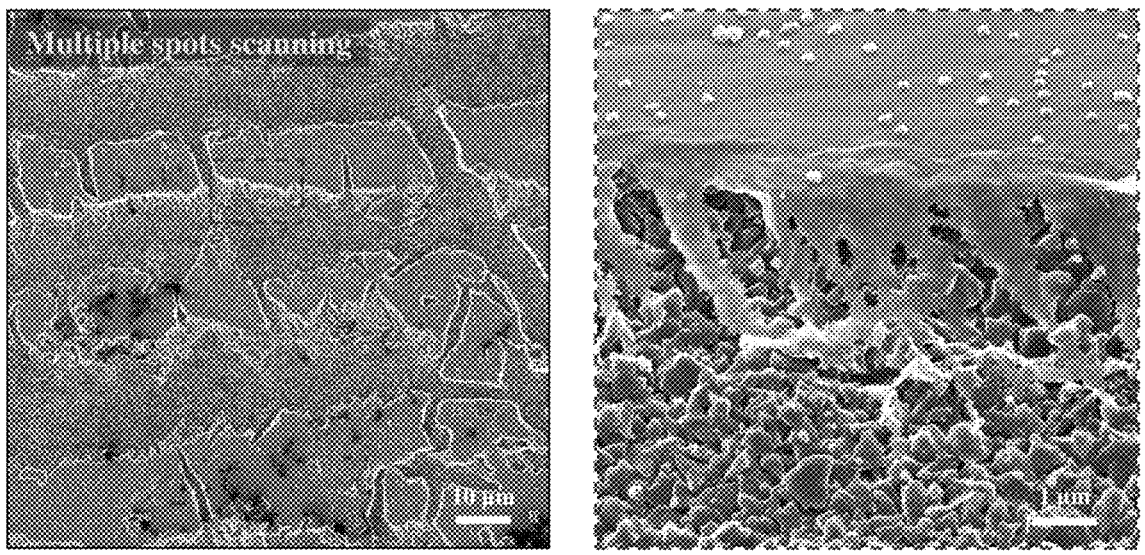
FIG. 5 is a scanning electron microscope morphology of a graphene fragment layer in a composite material according to Comparative Example 1.

The Comparative Example 1 uses the same method as in Example 1, except that the stretching operation is not performed before the hot pressing, the graphene is not fractured in advance, and/or the areas and spacing between the graphene fragments are not controlled. The formed graphene-copper composite material has a conductivity of 116.54% IACS by a four-probe method, and has a conductivity of 109% IACS after a bending test. The copper on one side surface of the graphene-copper composite material is etched with an etchant solution to expose the morphology of the graphene, which is observed by a scanning electron microscope. The results show (in FIG. 5) that, the graphene is distributed in different sizes within the copper matrix after random fracture within the composite material, and has the morphology of rectangular fragments. The maximum area of the fragments is about 2500 $\mu m^2$, and the minimum spacing and the maximum spacing between the fragments in two directions perpendicular to each other are about 2 $\mu m$ and about 30 $\mu m$, respectively. The above non-uniform area and spacing between the fragments include too large area and too small spacing, which leads to a decrease in the conductivity and a significant increase in stress in the bending state, making it impossible to maintain an excellent conductivity in the bending state.

Comparative Example 2

The Comparative Example 2 uses the same method as in Example 2, except that the stretching operation is not performed before the hot pressing, the graphene is not fractured in advance, and/or not all of the graphene fragments have an area of 50-1000 $\mu m^2$, and not all of the spacing between the fragments is 5-20 $\mu m$ in two directions perpendicular to each other. The formed graphene-aluminum composite material has a conductivity of 64.52% IACS by a four-probe method, and has a conductivity of 59.81% IACS after a bending test.

Comparative Example 3

The Comparative Example 3 uses the same method as in Example 3, except that the stretching operation is not performed before the hot pressing, the graphene is not fractured in advance, and/or not all of the graphene fragments have an area of 50-1000 μm², and not all of the spacing between the fragments is 5-20 μm in two directions perpendicular to each other. The formed graphene-silver composite material has a conductivity of 118.89% IACS by a four-probe method, and has a conductivity of 109.92% IACS after a bending test.

The above Examples and Comparative Examples are only random examples, which does not mean that only the above Examples can achieve the effects of the present disclosure.

As can be seen from the above Examples and Comparative Examples, metal composite materials in which the area of each of the graphene fragments is controlled to be 50-1000 μm² and the distance between adjacent two of the graphene fragments is controlled to be 5-20 μm can significantly increase the conductivity of the metal material by at least 18% and maintain the conductivity in the bending state.

The specific embodiments described herein are merely illustrative of the spirit of the present disclosure. Those skilled in the art to which the present disclosure pertains may make various modifications, additions, or analogous substitutions to the specific embodiments described, without departing from the spirit of the present disclosure or going beyond the scope defined in the appended claims.

Various technical features in the above embodiments may be combined arbitrarily, and not all possible combinations of the various technical features in the above embodiments are described for the sake of brevity of description. However, as long as there is no contradiction between the combinations of these technical features, they should be considered to be within the scope of this specification.

The invention claimed is:

1. A composite material for improving metal conductivity, characterized in that, the composite material comprises a composite of n A-B-A structures, wherein A is a graphene fragment layer, B is a metal foil layer, and n is an integer greater than or equal to 2; the graphene fragment layer comprises graphene fragments uniformly laid flat on the metal foil layer; and an area of each of the graphene fragments is 50-1000 μm² and a distance between adjacent two of the graphene fragments is 5-20 μm.

2. The composite material for improving metal conductivity according to claim 1, characterized in that, the graphene fragments are formed by fracturing chemically unmodified graphene which is single-layered, double-layered, or multi-layered.

3. The composite material for improving metal conductivity according to claim 1, characterized in that, a mass fraction of the graphene fragments in the composite material is 0.0004%-0.07%, or a volume fraction of the graphene fragments in the composite material is 0.001%-0.05%.

4. The composite material for improving metal conductivity according to claim 1, characterized in that, the metal foil layer is made of a conventional conductive metal material.

5. The composite material for improving metal conductivity according to claim 1, characterized in that, the metal foil layer is made of at least one of silver, copper, aluminum, magnesium, and alloys or composites thereof.

6. The composite material for improving metal conductivity according to claim 1, characterized in that, the metal foil layer has a thickness of 10-50 μm.

7. A method of preparing the composite material according to claim 1, characterized in that, the method comprises: compounding the n A-B-A structures into the composite material.

8. The method according to claim 7, characterized in that, graphene is deposited on upper and lower surfaces of the metal foil layer by CVD, and then the graphene is uniformly fractured by stretching to form the graphene fragments with certain areas and distances so as to form the A-B-A structure, and the composite material is formed by hot pressing the n A-B-A structures.

* * * * *